US006250819B1

(12) United States Patent
Porte et al.

(10) Patent No.: US 6,250,819 B1
(45) Date of Patent: Jun. 26, 2001

(54) MOUNTING OF AN INTEGRATED OPTIC CIRCUIT ON A MOTHERBOARD FOR THE CONNECTION OF OPTIC FIBERS TO FORM A MINIATURE OPTICAL COMPONENT

(75) Inventors: Henri Porte, Serre les Sapins; Michel de Labachelerie, Ferrieres les Bois; Jean-Claude Jeannot, Franois; Vincent Armbruster, Besancon, all of (FR); Neila Kaou, Montreal (CA); Pascal Mollier, Besancon; Nicole Devoldere, Penvenan, both of (FR)

(73) Assignee: Highwave Optical Technologies (FR)

( * ) Notice: Subject to any disclaimer, the term of this patent is extended or adjusted under 35 U.S.C. 154(b) by 0 days.

(21) Appl. No.: 09/557,377

(22) Filed: Apr. 25, 2000

(30) Foreign Application Priority Data

Apr. 28, 1999 (FR) .................................................. 99 05587

(51) Int. Cl.$^7$ ...................................................... G02B 6/36
(52) U.S. Cl. ................................ 385/88; 385/14; 385/49; 385/130; 385/131
(58) Field of Search .................................. 385/14, 15, 49, 385/50, 51, 52, 130, 131, 88, 89

(56) References Cited

U.S. PATENT DOCUMENTS

| | | | | |
|---|---|---|---|---|
| 5,432,878 | * | 7/1995 | Smous ..................................... | 385/52 |
| 5,475,775 | * | 12/1995 | Kragl et al. ............................. | 385/14 |
| 5,703,973 | * | 12/1997 | Mettler et al. .......................... | 385/14 |
| 6,064,781 | * | 5/2000 | Seibold et al. .......................... | 385/14 |
| 6,118,917 | * | 9/2000 | Lee et al. ................................ | 385/49 |

OTHER PUBLICATIONS

Lai et al., Silica on Si Waveguides for Self–Aligned Fibre Array Coupling Using Flip–Chip Si V–groove Technique, Electronics Letters, Sep. 1996, vol. 32, No. 20, pp. 1916–1917.
Hunziker et al., Self–Aligned Flip–Chip Packaging of Tilted Semi–conductor Optical Amplifier Arrays on Si Motherboard, Electronics Letters, Mar. 1995, vol. 31, No. 16, pp. 488–490.
Murphy, Fiber Attachment for Guided Wave Devices, Journal of Lightwave Technology, vol. 6, No. 6, Jun. 1988.

* cited by examiner

*Primary Examiner*—Brian Healy
(74) *Attorney, Agent, or Firm*—Blakely Sokoloff Taylor & Zafman

(57) ABSTRACT

A miniature optical component formed by the mounting of an integrated optic circuit chip has waveguides on a motherboard for connection with optic fibers. The fibers are positioned and aligned in parallel grooves hollowed out in the motherboard. The surface of the motherboard is hollowed out with female microstructures in the shape of axial buttonholes with sub-millimetrical dimensions, and the face of the chip has projecting male microstructures formed by metal deposition, capable of fitting into and sliding axially in the female microstructures during the mounting of the component. There is also provided a method for mounting a miniature component of this kind and a method for the matrix-based manufacture of a motherboard and a matrix device.

37 Claims, 5 Drawing Sheets

3a

3b

3c

MOUNTING OF AN INTEGRATED OPTIC CIRCUIT ON A MOTHERBOARD FOR THE CONNECTION OF OPTIC FIBERS TO FORM A MINIATURE OPTICAL COMPONENT

BACKGROUND OF THE INVENTION

1. Field of the Invention

The present invention relates to the field of integrated optic circuits or IOCs and more specifically to miniature optical components formed by the mounting of a chip comprising optic waveguides on an optic fiber connection support.

Recent developments in integrated optic circuits enable the incorporation of numerous active or passive optic elements (gratings, mirrors, etc.) and the association of various photonic functions (emitter, detector, diode, laser and other function) or electro-optical functions (modulator, coupler and other functions) in a miniature chip which in this case is practically an optical mini-bench.

In general, an integrated optic circuit is formed by a chip comprising a set of functional optical elements connected by optic waveguides conducting the processed light signals. The optical elements and the waveguides are implanted on the substrate of the chip.

2. Description of the Prior Art

Various types of substrate and different implant technologies have been implemented, in the prior art, to develop integrated optic circuits. In particular, there are known integrated optic circuit structures that associate the following substrates and layout technologies:

silicon (Si) with nitride or silica deposition, germanium (Ge), gallium arsenide (GaAs), with epitaxy, indium phosphide (InP), with epitaxy, lithium niobate ($LiNbO_3$), with metal diffusion, glass, with ion exchange technology, and polymers, with insulation or molding of guides; and this list is not exhaustive.

The substrate of an integrated optic circuit may be a semiconductor substance, especially silicon, or a non-conductive substance. The electrical properties are not of vital importance.

The use of integrated optic circuits is of considerable importance in fiber-optic telecommunications networks. In particular, it is being planned to incorporate signal-processing functions, by means of integrated optic circuits, in the communication lines themselves. The integrated optic circuits are thus destined to carry out on-line processing functions such as routing, multiplexing, demultiplexing, modulation, switching, and optic signal amplification.

The main obstacle to the development of the use of integrated optic circuits is the problem of the connection between optic fibers and optic circuit waveguides, because the fibers and guides have microscopic cores and need to be perfectly aligned for the effective transmission of the optical signals.

The problem, firstly, is to obtain very precise positioning of the cores of the optic fibers in the alignment of the axes of the waveguides implanted in a substrate chip.

Secondly, the problem is to obtain a stable, reliable and permanent attachment of the fibers to the waveguides.

In the manual method, each microscopic fiber is made to coincide with the respective microscopic waveguide and then the fiber and the guide are glued together by laboratory methods of mechanical or piezoelectric micropositioning. These methods are costly and cannot be envisaged for industrial-scale production.

There are hybridization methods which start with the positioning of a layer of optic fibers in a series of parallel groves hollowed out in a support so as to pre-arrange the fibers in a plane with a specified spacing between each fiber and the other fibers. Then, an integrated optic circuit is implanted in the substrate of a chip with optic waveguides traced out on the surface of the substrate block. The waveguides extend axially to the edge of the chip so as to be in a plane with the same spacing between them as between the fibers.

The problem then lies in adjusting the chip with respect to the fiber support so as to position the series of waveguides very precisely in the alignment of the layer of optic fibers.

The usual method in which the chip is positioned after the support, the waveguides are aligned in the axis of the fibers by manual action on an optical detection bench and then the chip is glued or soldered to the support has drawbacks of cost, lack of reliability and lack of industrial reproducibility.

An article by E.J. MURPHY, "Fiber Attachment for Guided Wave Devices" in the Journal of Lightwave Technology, June 1998, Vol. 6, No. 6 describes a developed technique that proposes the forming of two microscopic ribs to align a fiber support on the surface of the chip. This support comprises two plates that sandwich the fibers in the grooves. One of the plates is extended so that the plate and the chip overlap partially. The two micrometer-sized ribs of the chip fit into two grooves, free of fibers, hollowed out in supporting plates. The ribs are formed at the same time as the waveguides of the silicon chip, by the etching of the silicon passivation layer on the surface of the substrate.

One drawback of this technique is that the chip and the support are not fixed together but simply laid and aligned on top of each other. There is no mechanical holding whatsoever between the chip and the fiber support. Furthermore, the two micrometer-sized ribs do not prevent a tilting of the support around the axis of the ribs and a loss of alignment.

These methods and this technique are but partial and unsatisfactory mechanical approaches, so much so that they have been supplanted by what are called "flip-chip" techniques.

In the known flip-chip techniques, the chip comprising the waveguides is superimposed on a motherboard hollowed out with axial grooves in which fibers are positioned. The motherboard is therefore used as a support for the fibers and the chip.

The motherboard is generally formed by silicon, a crystalline material in which grooves can be made with excellent directivity. This enables the perfect alignment of the optic fibers and their precise positioning in a transversal plane.

The fibers are held fixed in the grooves by a plate or counter-plate hollowed out with grooves that are complementary to the grooves of the motherboard. This plate or counter-plate covers the layer of fibers positioned in the grooves of the motherboard so that each fiber is sandwiched in the hollow formed by two grooves and is held in position.

The problem then is to transfer the integrated optic circuit chip with precision on to the motherboard, in making the waveguides coincide with the optic fibers.

An article by W. HUNZIKER et al., entitled "Self-aligned Flip-chip Packaging of Tilted Semiconductor Optical Amplifier Arrays on Si Motherboard" in "Electronics Letters", March 1995, Vol. 31, No. 6, describes a technique for transferring a chip comprising waveguides to a motherboard hollowed out with grooves, with automatic positioning, the guides being embedded in the grooves. The fixing of the chip to the motherboard is obtained by the melting of intercalary solder stripes.

One drawback of this technique is that the guides undergo mechanical constraints that are harmful to the transmissions of optical signals.

Another drawback of this technique is that it is appropriate only when the waveguides have dimensions in the range of those of the grooves and the fibers, which is generally not the case since the dimensions of the waveguides varying according to the type of substrate.

An article by Q. LAI and the same authors, entitled "Silica on Si waveguides for self-aligned fibre array coupling using flip-chip Si V-groove Technique", in September 1996, in "Electronics Letters", Vol. 32, No. 20, describes an improvement of this technique in which each guide is bordered by two raised lateral ribs. Each pair of ribs bordering a guide rests on the two flanks of a respective groove, thus positioning the guide in the axis of the groove and of the fiber.

One drawback of these techniques is that there is no provision for attaching the chip and the motherboard which are simply laid one on the other. One of the directional parameters of alignment therefore is not set with precision.

The attachment requires subsequent steps of glueing or soldering which have the drawback either of being irreversible or of taking the substrate to high temperature.

Another drawback of these techniques is that they provide for the formation of raised substrate ribs making it necessary to clean almost the entire surface of the chip except for the waveguides, which have to be etched at the same time, when the chip is being manufactured.

More generally, the drawback of these flip-chip techniques is that they make use of etching by anisotropic chemical attack of the substrate of the chip to form the ribs. This attack is specific to certain crystalline substrates and, in particular, is appropriate neither to glass nor to lithium niobate.

The object of the present invention is to design a bonding of miniature optical components enabling a positioning with micrometrical precision and a perfect alignment of the waveguides of the integrated optic circuit chip and of the fibers immobilized on the motherboard, without any of the above-mentioned drawbacks.

A goal of the invention is to provide for a bonding that gives reliable, stable and permanent attachment.

Another goal of the invention is to design a universal mounting method applicable to every kind of substrate, including glass, lithium niobate and polymers, capable of adapting to every topography of integrated optic circuit chip, whatever the arrangement of the waveguides, whether raised or not.

Finally, a goal of the invention is to make miniature optical components by passive assembly that is simple, capable of automation and costs little.

SUMMARY OF THE INVENTION

Briefly, these goals are achieved, according to a technique of flip-chip assembly, by providing for the formation, on the surface of the chip, of projecting metal stems of sub-millimetrical dimensions, preferably in the form of mushrooms, and the hollowing out, in the motherboard that supports the fibers, of complementary apertures in the form of axial buttonholes, the mounting being done by taking the chip on to the motherboard in fitting the stems into the apertures. Each aperture preferably has a widened end to let through the head of a mushroom-shaped stem and a narrowed V-shaped end so that, after axial sliding, the mushroom-shaped stem is constricted so as to hold the chip against the motherboard while making the axis of the waveguides of the chip coincide exactly with the axis of the fibers of the motherboard since each millimetrical pad gets positioned very precisely at the tip of the V of the corresponding sub-millimetrical aperture.

The invention is made with a miniature optical component designed to process optical signals transmitted by optic fibers, the component comprising a mounting of the following elements:

a motherboard of anisotropic crystalline matter, having grooves on the surface that are parallel to an axial direction, each groove being adapted to receive an optic fiber, align it in the axial direction and position it in a transversal plane, and a substrate chip, one face of which comprises optical waveguides, the mounting consisting in carrying the face of the chip against the surface of the motherboard with the special feature wherein:

the surface of the motherboard is hollowed out with female microstructures in the shape of axial buttonholes with sub-millimetrical dimensions, wherein, the face of the chip has projecting male microstructures formed by metal deposition, capable of fitting into and sliding axially in the female microstructures during the mounting of the component.

Preferably, the female microstructures have a narrowed axial end in the form of an open angle that is symmetrical to the axial direction.

Preferably, the female microstructures go through the thickness of the motherboard.

Advantageously, the motherboard is narrowed at the locations of the female microstructures.

Advantageously, a female microstructure has a catch part capable of blocking a male microstructure.

According to a preferred embodiment of the invention, the male microstructures are mushroom-shaped.

According to the preferred embodiment of the invention, the female microstructures have a wide distal part capable of letting through a male microstructure mushroom head, and a narrow distal part capable of constricting the mushroom head.

Advantageously, the invention also provides for the mounting of the motherboard on:

at least one plate of anisotropic crystalline material etched on the surface with grooves parallel to the axial direction, each groove being adapted to receive an optic fiber and hold it fixed in the transversal position, the surface of the plate comprising male microstructures formed by metal deposition, capable of fitting into and sliding axially in female microstructures of the motherboard, during the mounting of the component. Preferably, the male microstructures of the plate are mushroom-shaped.

The invention can be obtained partially with a miniature optical component motherboard, formed by anisotropic crystalline material and comprising a surface etched with grooves parallel to the axial direction, each groove being adapted to receive an optic fiber and position it in a transversal plane, the surface of the motherboard being capable of receiving an integrated optic circuit chip with the special feature wherein the surface of the motherboard is hollowed out with female microstructures in the shape of axial buttonholes with sub-millimeter dimensions.

The invention can also be made partially with an integrated optic circuit chip consisting of a substrate and comprising optic waveguides on one face, the face of the chip being capable of being attached to a motherboard to constitute a miniature optical component with the particular feature wherein the face of the chip comprises projecting male microstructures with sub-millimeter dimensions formed by metal deposition.

The invention can also be obtained partially with a miniature optical component plate, the plate being formed by an anisotropic crystalline material and comprising a surface hollowed out with grooves parallel to an axial direction, each groove being adapted to receive an optic fiber, align it in the axial direction and position it in a transversal plane, with the particular feature wherein the surface of the plane comprises projecting male microstructures, with sub-millimeter dimensions, formed by metal deposition.

According to the invention, it is furthermore planned to implement a method for the mounting of a miniature optical component designed to process optical signals transmitted by optic fibers, the component comprising:

a motherboard of anisotropic crystalline matter having grooves on the surface that are parallel to an axial direction, each groove receiving an optic fiber and aligning it in the axial direction and positioning it in a transversal plane, and a substrate chip, one face of which comprises waveguides, the mounting consisting in attaching the face of the chip against the surface of the motherboard, the method comprising steps consisting in:

hollowing out female microstructures, in the shape of axial buttonholes, in the surface of the motherboard made of anisotropic crystalline material, the female microstructures having sub-millimeter dimensions, making a metal deposit to form projecting male microstructures on the face of the substrate chip, and fixedly joining the chip with the motherboard by fitting the male microstructures into the female microstructures, and by obtaining a sliding motion in the axial direction.

Preferably, the formation of the male microstructures comprises a preliminary step that consists in:

metallizing the face of the substrate chip.

Advantageously, it is planned to:

etch the metallization by keeping the metallized zones solely at the locations of the male microstructures.

According to a preferred alternative variant, the male microstructures are formed by electrolysis through sub-millimeter sized recessed openings (namely embrasures) pierced in a matrix covering the face of the chip.

According to the preferred mode of the method, electrolysis is prolonged so that the metal deposition flows over the recessed openings of the matrix.

According to the preferred mode of the method, the matrix is formed by a thick layer of polymer or resin.

According to the preferred mode of the method, the matrix is removed to bring out the male microstructures.

It is provided that the female microstructures will comprise a narrowed end in the form of an open angle that is symmetrical to the axial direction.

According to one preferred alternative variant, the hollowing of the female microstructures consists in:

making an anisotropic etching in the motherboard made of crystalline material.

According to a preferred alternative mode of the method, the hollowing of the female microstructures consists in:

performing a laser etching of the motherboard.

Preferably, the hollowing of the female microstructures goes through the thickness of the motherboard.

Advantageously, the hollowing of the female microstructures comprises a preliminary step consisting in:

reducing the thickness of the motherboard at the locations of the female microstructures.

Advantageously, the thinning of the motherboard and the hollowing out of the grooves are done during a single step of anisotropic chemical attack.

Advantageously, the hollowing out of the grooves and the hollowing out of the female microstructures are done during a single step of anisotropic chemical etching.

According to the invention, it is furthermore planned to implement a method for the manufacture of motherboards of miniature optical components comprising a step consisting in:

molding the motherboard on a matrix whose surface comprises raised ribs, parallel to an axial direction, and projecting microstructures in the form of axial tongues with sub-millimeter dimensions.

Finally, the invention is made with a matrix device for the manufacture of motherboards of miniature optical components, wherein a surface of the matrix comprises raised ribs, parallel to an axial direction, and projecting microstructures shaped like axial tongues with sub-millimeter dimensions.

According to one embodiment of the device, the matrix is made of an anisotropic crystalline material.

According to another embodiment of the device, the matrix is made of metal, the matrix being made by metal impression on a motherboard consisting of anisotropic crystal material.

BRIEF DESCRIPTION OF THE DRAWINGS

Other goals, characteristics and advantages of the invention shall appear from the following description, given by way of an exemplary non-restrictive embodiment, and the appended drawings, of which.

MORE DETAILED DESCRIPTION

Figure 1:
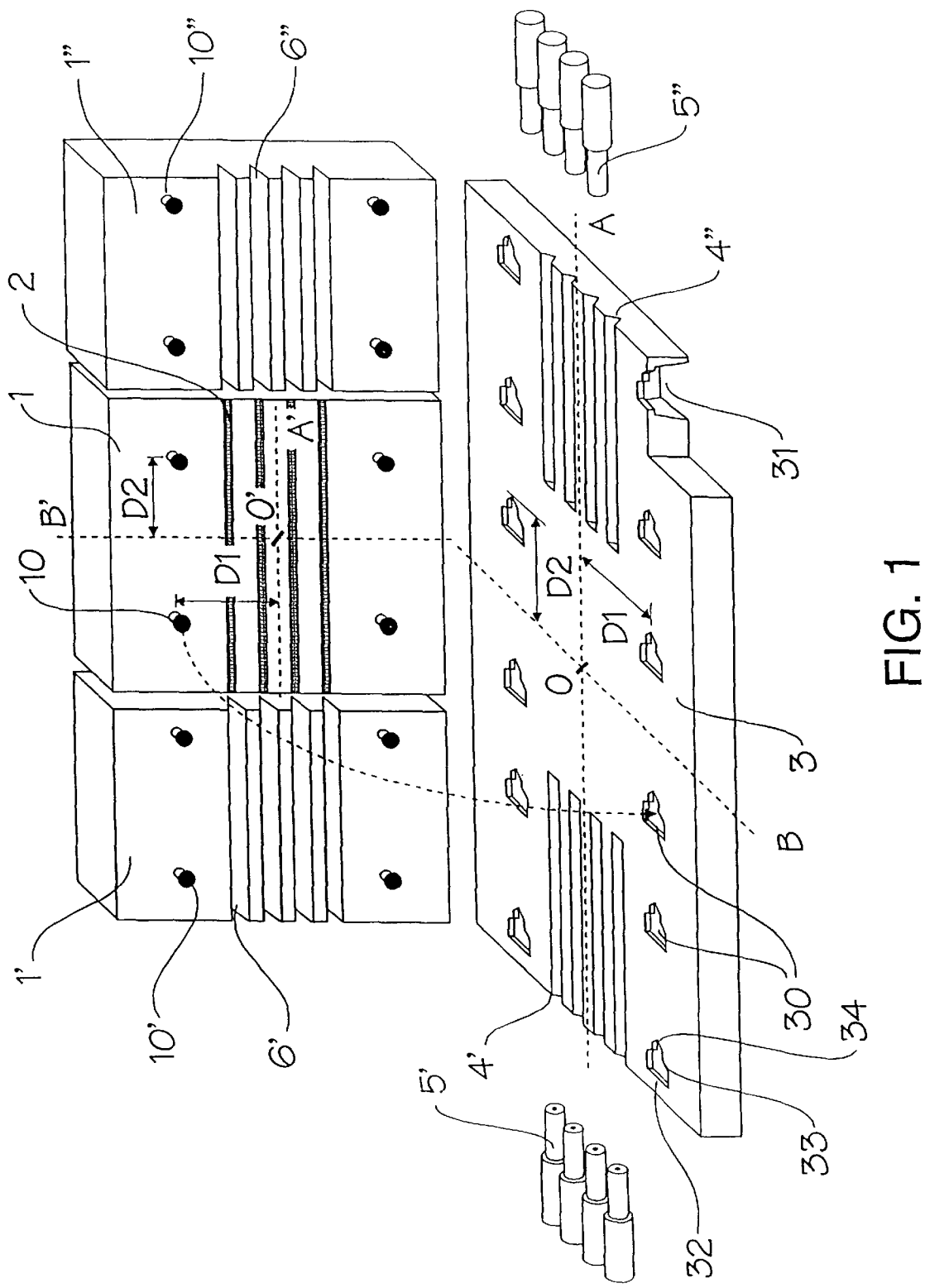
FIG. 1 shows an exploded view of the mounting of an integrated optic circuit chip as well as two plates on a motherboard forming a miniature optical component according to the invention.

Referring now to FIG. 1, it can be seen that an optical component according to the invention comprises a motherboard 3 and an integrated optical circuit chip 1, as well as two additional plates 1', 1".

The motherboard 3 is hollowed out with one or more series of parallel grooves 4' and 4" used to position optic fibers 5' and 5" by aligning them in the axis OA of the grooves and positioning them precisely in a transversal plane BOB'.

It is possible to hollow out only one series of grooves or a series of grooves that is not parallel to another series of grooves.

The grooves are preferably hollowed out parallel to the longitudinal axis OA of the motherboard, two series of grooves 4, 4" being advantageously cut out from each longitudinal end of the motherboard so as to receive respectively a layer of incoming optic fibers 5', and a layer of outgoing optic fibers 5".

The longitudinal axis OA then constitutes the optical axis, namely the axis of propagation of the optical signals transmitted by the incoming fibers 5' and then by the outgoing fibers 5".

Figure 7:
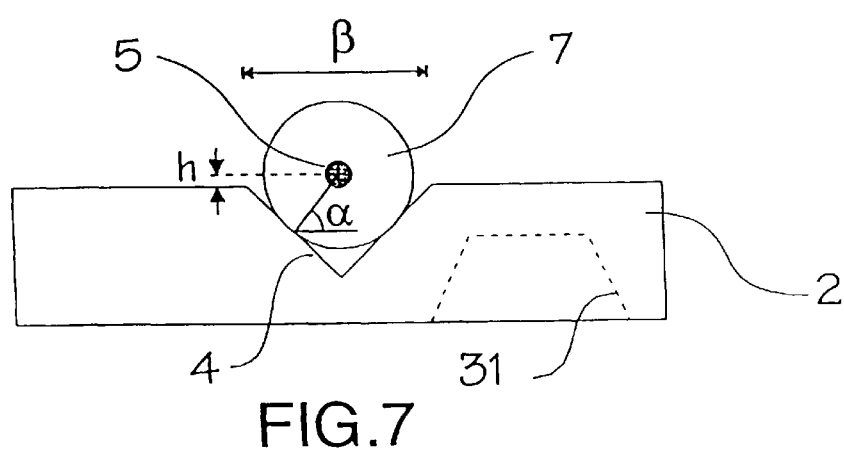
FIG. 7 shows a cross-sectional view of the fixed holding of an optic fiber in a groove of a motherboard of miniature optical components.

It is advantageously planned to hollow out the grooves by anisotropic chemical etching, the motherboard 3 being constituted by an anisotropic crystalline material such as silicon. This arrangement has the twofold advantage of enabling:

firstly, the tracing of perfectly rectilinear grooves provided that the layout follows a direction parallel to a crystallographic axis of the material of the motherboard; and secondly, as shown in detail in FIG. 7, the hollowing out of V-shaped grooves with ideally plane flanks inclined by an angle α that is perfectly determined by the crystallographic structure of the material.

The symmetrical dihedral shape of the grooves gives only two lines of support to the circular section fibers enabling the cores of the fibers to be perfectly localized in space. The axis of a fiber thus has a positioning that follows the hollow of the groove.

As can be seen in FIG. 7, the active part of an optic fiber 7 that conveys light, called the core 5, occupies a very small diameter, smaller than about 10 micrometers, while the external diameter of the fiber goes up to about a hundred micrometers (typically 125 µm). The fact of hollowing out V-shaped grooves by anisotropic chemical etching advantageously makes it possible to achieve full control over the positioning of the fiber 7 with respect to the motherboard 3, the height h of the center of the fiber being fixed with a high degree of precision by the radius of the fiber, the crystallographic angle α and the aperture of the groove β.

It is possible, as suggested by FIG. 7, to envisage the possibility of having the height of the center of the fiber correspond to the radius of the core 5 so that the core 5 of the optic fiber is flush with the surface of the motherboard 3.

The optical integrated circuit chip indeed comprises waveguides that are implanted so as to be either raised or flush with the face of the chip.

The core or active section of these waveguides also reaches dimensions smaller than about 10 micrometers.

Figure 5:
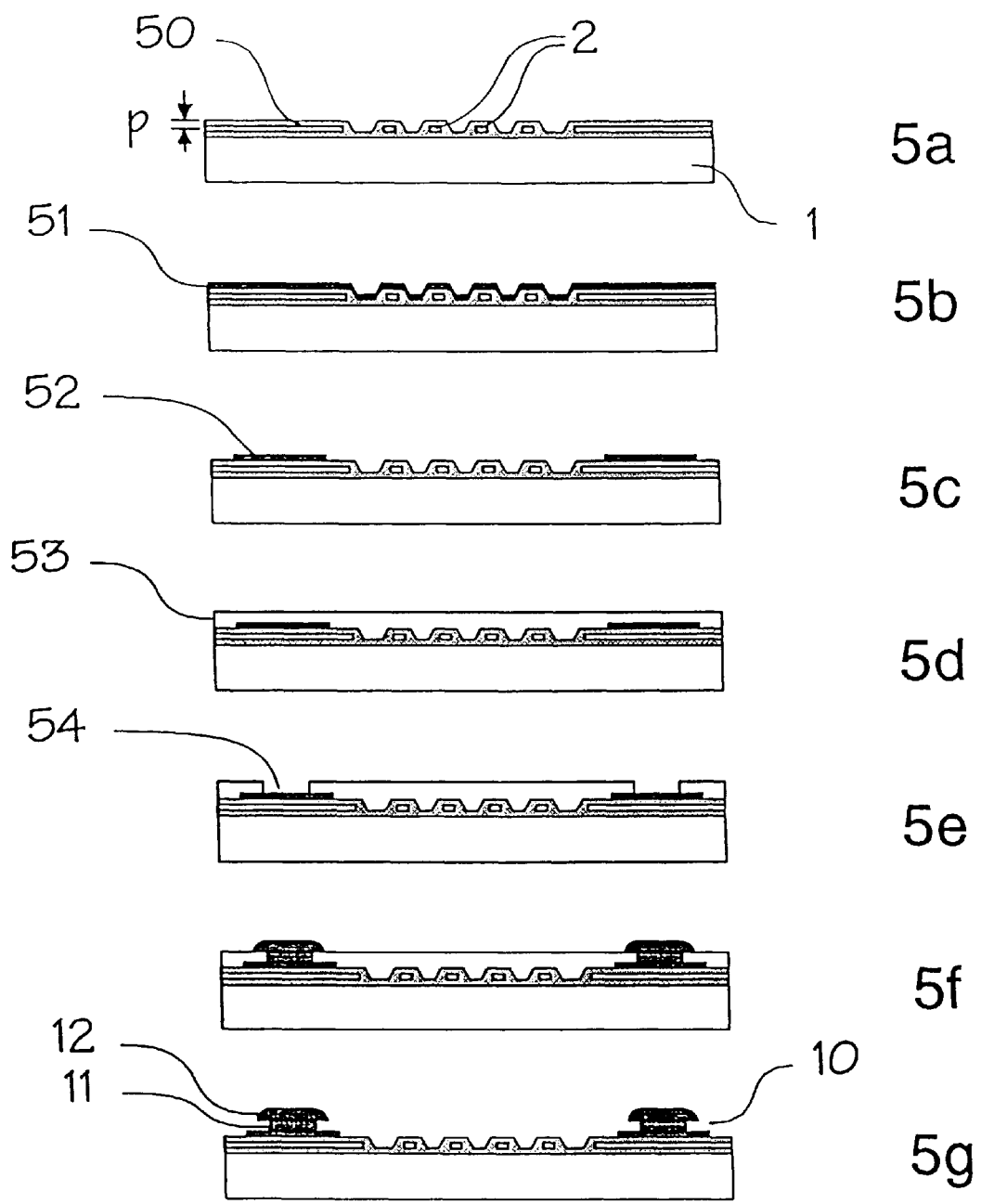
FIGS. 5a–g shows cross-sectional views of a miniature optical component chip during steps for the shaping of projecting male microstructures according to the method of the invention.

As indicated in FIG. 5, which is seen in a sectional view 5a, the center of the waveguides is located at a depth p with respect to the cladding surface of these guides, the surface forming a plane of contact with the motherboard. It is therefore planned that the height h of the center of the fibers with respect to the surface of the motherboard will be equal or close to the value of the depth p of the center of the waveguides with respect to the contact plane.

When the face of the chip is taken against the surface of the motherboard, the plane of the cores of the waveguides is thereby advantageously in a position of coincidence with the plane of the cores of the fibers.

Each end of a waveguide is extended in parallel to the optical axis O'A' up to two opposite edges of the chip. The guides are not necessarily rectilinear throughout their length. The cleaving of the waveguides at the edges of the chip must be done with great care since the ends have to be perfectly perpendicular to the optical axis O'A'.

Now, what has to be done is to position and fixedly join the chip to the motherboard by making the optical axis O'A' of the waveguides perfectly coincide with the axis OA of the grooves 4', 4" and of the optic fibers 5', 5".

To this end, the invention provides for the forming of projecting male microstructures on the surface of the chip and the hollowing out of complementary female microstructures in the motherboard. The microstructures have sub-millimeter dimensions to enable the chip to be positioned with respect to the motherboard with a precision far greater than one micrometer.

It is possible to envisage obtaining an approximate embodiment of the invention with female microstructures in the shape of simple axial buttonholes and male microstructures in the shape of simple cylindrical stems.

Figure 3:
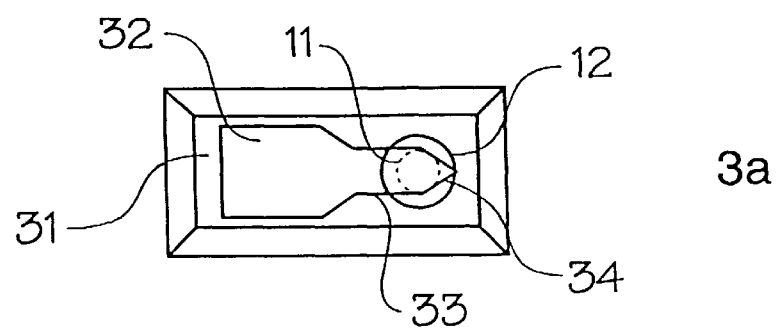
FIGS. 3a–c shows top views of details of the making of a female microstructure of a miniature optical component according to the invention.
Figure 3:
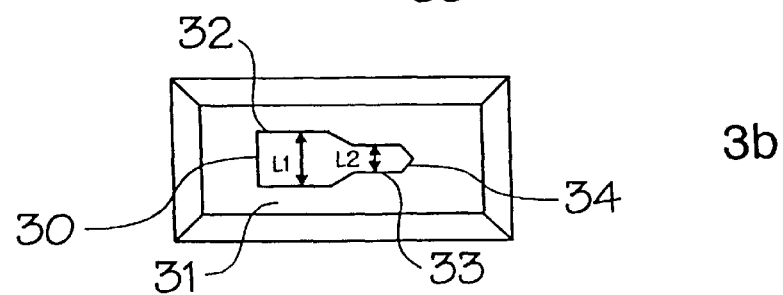
Figure 3:
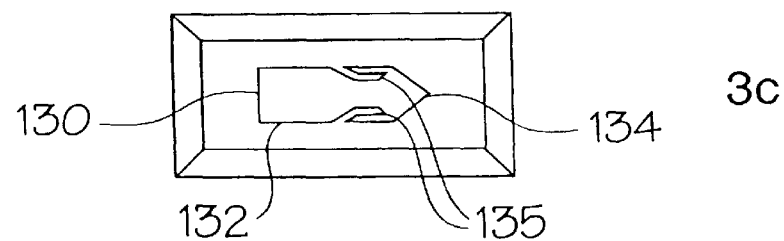

As indicated by the detailed views of FIG. 3, the female microstructures 30 generally have an axial buttonhole shape, namely they form apertures in the motherboard that develop along the longitudinal axis OA.

The buttonhole-shaped female microstructures advantageously have a narrowed end in the shape of a point. Through this feature, each male microstructure can be fitted into the other end of the buttonholes and then the chip can be made to slide against the motherboard until each male microstructure is embedded in the narrowed end of the buttonhole without adversely affecting the alignment of the waveguides with the fibers since the guides and the fibers are aligned axially and since the sliding follows the same direction.

The fact that the buttonholes have a narrowed end makes it possible to fixedly tie the male microstructures to the tip of the female microstructures with a cross-positioning precision that is very high, appreciably higher than one micrometer.

Preferably, the male microstructures comprise a base shaped like a circular stem. As in the case of the positioning of the circular fiber in the V of a groove, the circular stem rests at two points on the symmetrical V-shaped edges of the axial end of a female microstructure. The position of the center of the stem is therefore perfectly aligned with the axis of symmetry of the axial buttonhole. Advantageously, an error in the value of the diameter of the stem therefore has no influence on the transversal positioning of the male microstructure with respect to the female microstructure.

Furthermore, according to the invention, it is planned that the male microstructures 10 will have a mushroom shape. Thus, as shown in the axial section of FIG. 2, each male microstructure has a narrow base 11 and a widened head 12. The section of the base 11 is smaller than the maximum section of the head 12. In general, the male microstructures have a circular shape generated by revolution.

It is planned consequently, according to this preferred embodiment, that the female microstructures will have a wide distal part 32 capable of letting through the mushroom head of a male microstructure and another narrow distal part 33 capable of constricting the mushroom head of the male microstructure. The narrow distal part 33 ends axially at the narrowed end 34 enabling a very precise cross-positioning of the male microstructure.

According to the example of FIG. 3b, the aperture of a female microstructure comprises a first distal part with a width L1 followed axially by a symmetrical bottleneck towards a second distal part with a width L2 smaller than L1. The second distal part ends axially in a tip with symmetrical V-shaped edges.

The dimensions, in width L1 and in length, of the wide distal part 32 are greater than the maximum section, or specifically the diameter, of the mushroom head 12 of the male microstructure.

The width L2 of the narrow distal part 33 of a female microstructure is slightly greater, or even equal, to the width or specifically to the diameter of the base 11 of the male microstructure.

On the contrary, the width L2 of the narrow distal part 33 is smaller than the maximum width, or specifically the diameter, of the mushroom head 12 of the male microstructure so as to prevent a releasing of the head 12 out of the aperture 30 after the sliding motion. The purpose of this feature is to keep the chip blocked or even flat against the motherboard.

Figure 2:
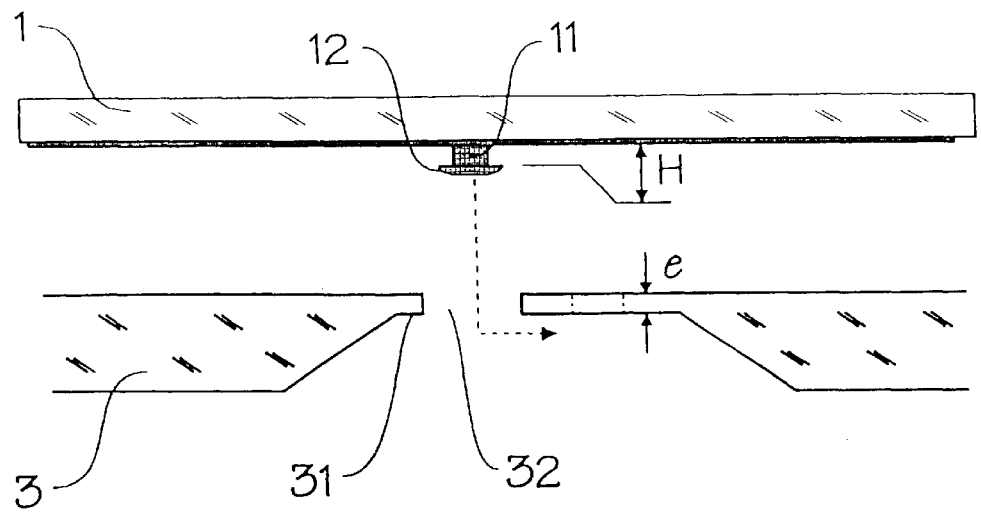
FIG. 2 shows an axial sectional view of the fitting together of a male microstructure and a female microstructure of a miniature optical component according to the invention.

Furthermore, as shown in FIG. 2, it is planned that the height H of the base 11 of the male microstructures will be slightly greater than or, at the limit, equal to the thickness of the motherboard 3, the thickness e being measured at the location 31 of the female microstructures. The difference between the height H of the base of the male microstructures and the thickness e of the motherboard advantageously makes it possible to keep a small vertical mechanical clearance between the chip and the motherboard.

However, the motherboard is generally formed in a relatively thick substrate wafer in order to ensure its solidity and rigidity. It is then advantageously planned to thin the motherboard at the locations 31 of the female microstructures in order to limit the height H of the male microstructures and preserve their solidity.

Figure 4:
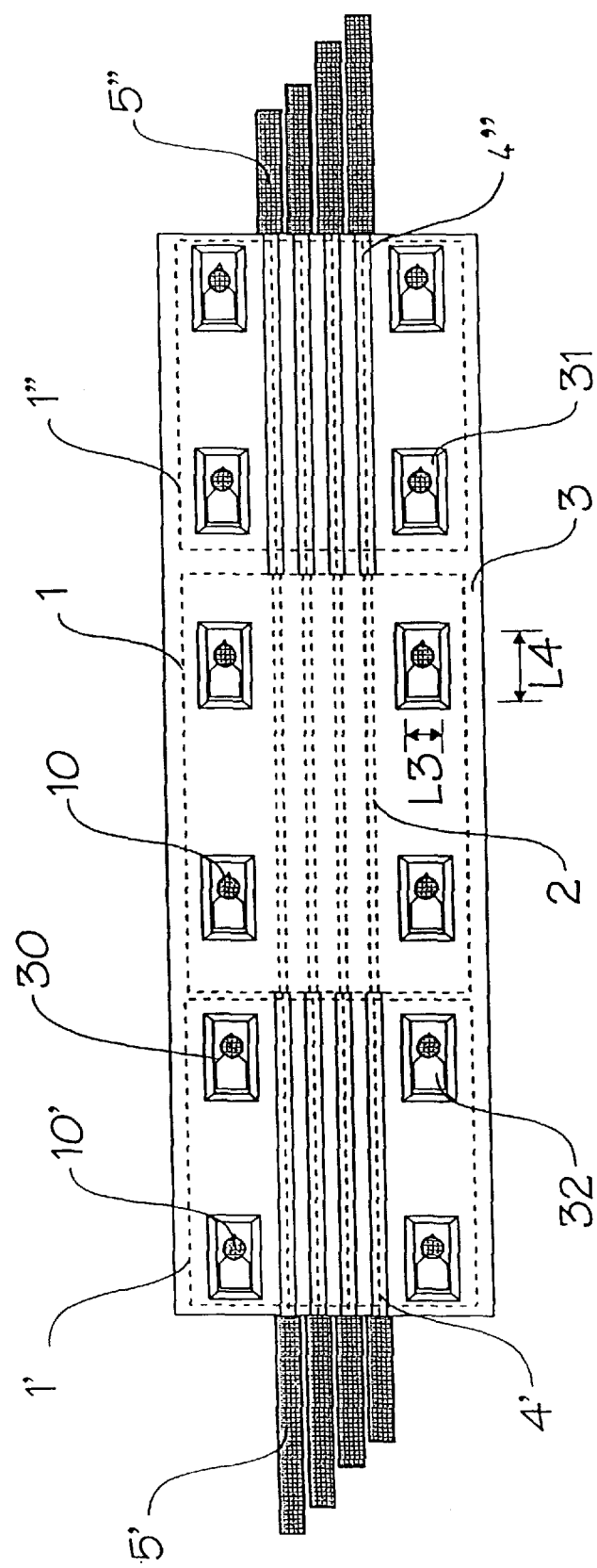
FIG. 4 shows a bottom view of the mounting of a miniature optical component according to the invention.

The thinning forms membranes 31 with a fine thickness e. These membranes 31 occupy a surface area that encompasses the position of a female microstructure. As shown in FIG. 4, the surface area covered by each membrane preferably has dimensions that are limited in width L3 and in length L4 so as not to weaken the motherboard or the mounting.

The dimensions of the mounting microstructures may vary in great proportions, from several micrometers to one millimeter, and therefore belong to the sub-millimeter range. The etching and positioning precision however may attain values of less than one micrometer. The male microstructures preferably have dimensions of about one to several hundreds of micrometers. The axial buttonholes of the female microstructures may have a length in the range of several hundreds of micrometers to several millimeters and a width in the range of several hundreds of micrometers. The thickness of the motherboard is generally about several tens to several hundreds of micrometers. Given the dimensions of the male microstructures, the thinning of the motherboard at a location of the membranes locally reduces this thickness to a few tens of micrometers.

It may furthermore be noted that the invention can be obtained in an approximate embodiment by providing for female microstructures that form blind necks, the female microstructures being hollowed out in the surface of the motherboard without going through its thickness. It is even possible to provide for concave necks with a dovetailed profile enabling the sliding of the mushroom head of the male microstructure.

The male microstructures therefore have a self-locking rivet function capable of engaging and getting embedded in a precise position in the apertures of the female microstructures.

According to an advantageous variant, shown in FIG. 3c, it is planned that female microstructures will comprise a catch structure 135.

In this case, as shown in FIG. 3c, it is preferable that the aperture of the female microstructures 130 should go through the motherboard at a location where the thickness of the motherboard is thinned to the point of forming a relatively thin membrane.

The aperture has a general arrow shape with two symmetrical free strips that border the narrowed distal part and fulfil a non-return catch function. Alternately, the aperture may be dissymmetrical and comprise only one lateral strip forming a simple catch.

According to the example shown in the view 3c of FIG. 3, the shape of the aperture is obtained from an etching mask whose aperture comprises:

- a wide distal part 132 that narrows gradually in the form of a bottleneck, towards
- another distal part 134 that has a pointed axial end in the shape of a diamond, and
- two notches 135 hollowed out of the two side tips of the diamond, in parallel and towards the edges of the wide distal part 132.

What remains therefore, after etching, is an aperture 130 constricted in its median part by two strips 135 finely and flexibly attached to the lateral edges of the aperture. These two strips 135 form a spring when the base of the male microstructure slides axially and then they relax and hold the male microstructure blocked at the end 134 of the female microstructure. The catch structure 135 therefore has a function of locking a male microstructure stem in the embedded position.

The advantage of this alternative embodiment is that it axially blocks the chip with respect to the motherboard and holds the chip permanently flat against the surface of the motherboard.

It is possible to plan to limit the proportion of female microstructures of the motherboard that are provided with catch portions, or even to provide only one female microstructure with a catch, which is enough to hold the chip fixed in the sliding position.

The number of male microstructures implanted on the surface of the chip and of corresponding female microstructures should be high enough to provide for the solidity of the mounting given the fact that the male microstructures have a sub-millimeter section. The number of male microstructures on the surface of the chip may however be limited to three or four as shown in FIG. 1. This simplifies the making of the etching masks and limits the alignment defects. A minimum of three non-aligned male microstructures is needed to form a bonding plane and prevent an effect of tilting around an axis. According to the advantageous exemplary embodiment of FIG. 1, four male microstructures are positioned at the four corners of the chip, providing for the solidity and rigidity of the mounting without excessively encumbering the area surrounding the chip.

The invention also provides for making one or more additional plates 1', 1" designed for the fixing of the fibers. The plates are made of anisotropic crystalline material, preferably silicon.

The surface of each plate is hollowed out with parallel grooves and comprises male microstructures. Preferably, the grooves of the plates have a V-shaped profile. This is not obligatory provided that the grooves of the motherboard have a V-shaped profile.

The grooves of a plate and the grooves of the motherboard are complementary and have the same arrangement, the same spacing. Indeed, the plate is designed to cover the layer of fibers, each fiber being thus fixedly held permanently between a groove of the plate 1' and a groove of the motherboard 3.

The male microstructures 10' of the plate 1' have a shape similar to the male microstructures 10 of the chip 1 and attach the plate to an end part of the motherboard.

The female microstructures 30 are hollowed out in the motherboard facing the male microstructures 10', 10" of each plate 1', 1". The number of male microstructures of a plate may vary as required from at least two to a great number of them.

In FIG. 1, the miniature optical components made according to the invention has a motherboard 3 to which there are attached a chip and two plates since the component has a layer of incoming fibers 5' at one end and a layer of outgoing fibers 5" at the other end.

According to this exemplary embodiment, four male microstructures are positioned at the four ends of each plate 1', 1", advantageously releasing the median part of each plate in which the grooves are laid out, the chip comprising also four male microstructures. The motherboard consequently has twelve complementary female microstructures.

The mounting of an optical component according to the invention then consists in carrying the chip on to the motherboard, fitting the male microstructures into the female microstructures and making them slide in these female microstructures. A series of incoming optic fibers 5' is then positioned in the grooves 4' of the motherboard. An optional plate 1' may then advantageously be carried to the layer of fibers by fitting the male microstructures into the female microstructures and making them slide in the female microstructures, to hold the fibers fixed precisely and permanently. An identical procedure is followed for the arrangement of the outgoing fibers 5", preferably held fixed by a second plate 1" at the other longitudinal end of the motherboard.

Alternately, the plates 1', 1" may be omitted, the fibers 5' and 5" being held fixed simply by glueing.

FIG. 4 shows a top view of a motherboard of a miniature optical component mounted according to the invention when the plates and the substrate chip are attached against the motherboard and the male microstructures are embedded in the female microstructures.

It can be seen that the male microstructures 10', 10" and 10 of the plates 1', 1" and the chip 1 are embedded at the axial end of the female microstructures 30 after having been fitted into the wide distal part 32 of said female microstructures 30. The mushroom heads of the male microstructures 10', 10", and 10 which are wider than the narrow distal parts of the female microstructures hold the plates 1', 1" and the chip 1 fixedly joined to the motherboard 3, while fixedly holding, in their position, the fibers inserted in the grooves of the motherboard and of the plates.

It can be seen in FIG. 4 that, advantageously, the axial translation of the male and female microstructures does not attenuate the light transmission between the optic fibers 5', 5" and the waveguides 2, because the spacing between the end of the fibers and the end of the guides may reach some hundreds of micrometers without prompting any significant losses of light.

It must be noted that the arrangement of the assembly microstructures along the longitudinal edges of the component advantageously creates a wide median space for the placing of the grooves, the optic fibers and the waveguides while giving solidity to the mounting.

One advantage of the mounting according to the invention is that it enables the mounting and dismounting of the miniature optical component. This makes it easy to modify the optic fiber connections, if necessary by working on the spot in an optical telecommunications network.

Another advantage is that it enables a passive self-alignment of the optic fibers and the waveguides, in micromechanical intervention.

The essential advantage of the system of mounting according to the invention is that it enables a perfect 3D alignment of a series of waveguides and optic fibers.

Indeed, the arrangement of the fibers in the grooves hollowed out by anisotropic chemical etching enables the parallel alignment of all the fibers in the plane of the motherboard, provides full knowledge of the direction of alignment and makes it possible to fix their spacing with precision.

The female microstructures are advantageously hollowed out in the motherboard by anisotropic chemical etching. Thus, the direction of alignment of the axial buttonholes is identical to that of the grooves. Preferably, the grooves and the female microstructures are hollowed out during the same chemical etching step with a single mask, to prevent any error in the lateral position D1 and axial position D2 of each female microstructure tip with respect to the center 0 of the motherboard and the grooves 4', 4".

Providing for mushroom-shaped male microstructures makes it possible to place the chip flat against the motherboard and obtain an exact correspondence between the plane of the waveguides and the plane of the optic fibers.

Embedding the male microstructures in the tip of the female microstructures makes it possible to align the direction O'A' of the waveguides perfectly with the axial direction OA of the optic fibers, laterally position the axis of the waveguides very precisely with respect to the axis of the optic fibers and make them coincide.

Thus, advantageously a very precise 3D alignment of the waveguides with the optic fibers is obtained. This enables efficient transmission of the optical signals.

Another advantage of the invention is the simplicity and passive aspect of the mounting which does not require any lengthy handling operations by an operator on an optical test bench.

Another advantage of the mounting is its low cost as it is easy to automate the steps for making microstructures.

Figure 6:
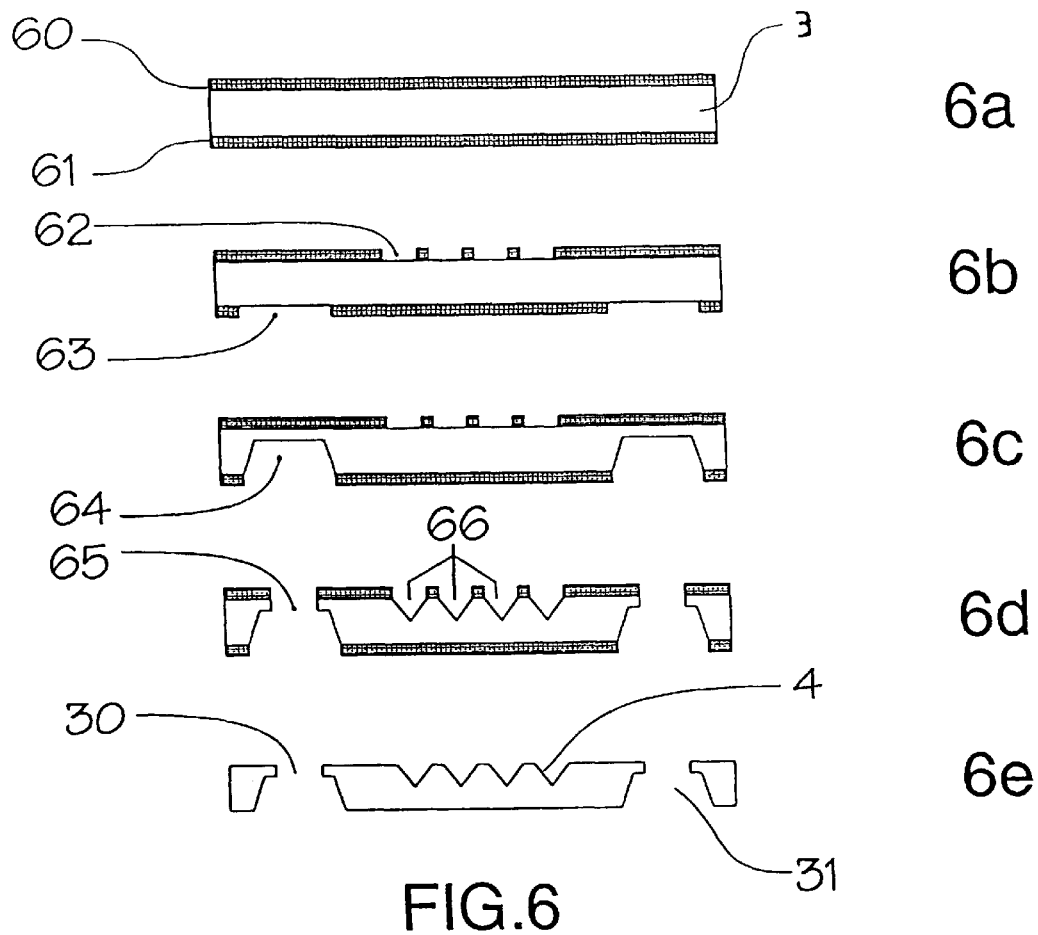
FIGS. 6a–e shows cross-sectional views of a miniature optical component motherboard during steps for the hollowing out of female microstructures according to the method of the invention.

The invention also relates to a method for the manufacture and mounting of an optical component of this kind, whose steps shall now be described in detail with reference to FIGS. 5 and 6.

According to the invention, the male microstructures are formed by metal deposition on the surface of the chip.

Preferably, the operation is done by the electrochemical deposition of metal through a matrix pierced with recessed openings.

Before any metal deposition is done, as shown in the view 5a of FIG. 5, the waveguides 2 are implanted on the surface of the chip 1. The chip is for example made in a silicon substrate on which a waveguide made of doped silicon is deposited. The surface of the waveguides and the entire chip is then passivated with a thin film of an oxide such as silica.

To facilitate the clinging of the metal deposit, it is preferable, as a preliminary step, to make a metallization 51 of the surface of the chip and the waveguides as shown in the views 5b and 5c.

The metallization layer 51 is made of a metal that promotes electrolytic growth such as indium, nickel or gold, and has a very fine thickness.

As shown in FIG. 5c, the metallization is preferably done throughout the surface of the chip, and then withdrawn by etching through a mask except at the positions of the male microstructures. Thus, there remain zones 52 covered with a thin metallization layer at the location of the male microstructures.

The etching of the metallization can be done by physical or chemical means, using wet or dry methods, in particular by a plasma-assisted photo-etching process.

According to the method of the invention, the surface of the chip is coated with a flat thick layer 53 of a highly viscous polymer such as polymethyl methacrylate (PMMA) or preferably a resin, especially a photosensitive resin.

The coating of the layer 53 of viscous material can be done by centrifugation or by spin-coating for example. The thickness of the layer 53 corresponds to the height H of the bare of the mushroom-shaped male microstructures.

The layer 53 of polymer material is indeed designed to form an electroshaping matrix for the male microstructure stems, namely a thickness of material pierced with recessed openings that are via holes, forming the cavity impression mold for the stems in which the metal is then deposited by electrolysis.

As shown in the view 5e, the layer 53 is therefore pierced with vertical recessed openings 54 at the planned location of the male microstructure stems.

The recessed openings 54 reach the bottom of the layer 53 and bare the metallized zones 52. The recessed openings 54 preferably have a circularly section designed to form round stems.

In the case of a matrix layer 53 made of PMMA, the recessed openings 54 may be pierced by laser ablation, which advantageously gives perfectly vertical walls.

In the case of a matrix layer 53 made of photosensitive resin, the recessed openings 54 may be pierced by photo-etching, in exposing the resin to ultraviolet radiation through the apertures of a mask and then eliminating the exposed resin in a chemical developing bath.

Care must be taken to position the recessed openings very precisely with respect to the waveguides, especially by taking reference with respect to marks 0' and axes O'A', O'B', plotted on the surface of the chip in order to meet the conditions of alignment with the optic fibers of the motherboard.

According to the method of the invention, a metal deposition by electrolysis is then performed through the recessed openings 54 of the matrix 53.

The substrate chip 1 covered with the matrix layer 53 is then plunged into an electrolytic bath charged with metal ions.

The electrolyzed metal then gets deposited at the bottom of the recessed openings 54, in advantageously clinging to the metallization 52, which plays the role of a crystal seed. The metal deposition then grows gradually in filling the vacant portion of the recessed openings until it reaches and goes beyond the thickness of the matrix layer 53.

According to the method of the invention, it is planned that the metal deposit will then continue to grow and flow over the recessed openings, developing evenly and in every direction beyond the perimeter of the recessed openings.

In a particularly simple and original way, a mushroom-shaped metal deposit 10 is thus obtained. This is a deposit with a cylindrical base 11 whose section corresponds to the section of the recessed opening 54 and a head 12 with a maximum section that is greater than the section of the recessed opening 54 and has an ideally hemispherical shape.

With respect to the metal deposited to form the male structures, nickel and gold are preferred to copper, silver and indium for reasons of resistance to mechanical strains and corrosion.

The metals of the metallization layer 51 and of the electrolytic deposit may be different.

Finally, the shaping of the male microstructures of the chip is completed, as can be shown in the view provided in FIG. 5g, by a step consisting of the elimination of the matrix layer 53 thus clearing the base 11 of the male microstructures 10 and the entire surface of the chip. The polymer material, such as PMMA or resin, constituting the layer 53, may be cleaned by chemical means preferably.

The method according to the invention comprises yet other special steps for making and mounting the motherboard. These steps are illustrated in FIG. 6.

These steps advantageously make use of techniques of anisotropic chemical etching of the crystal material of the motherboard. These techniques give great positioning precision since the etching follows axes of crystal cleavage and promotes triangular shapes enabling the perfect centering of a fiber or circular stem despite any error in their diameter.

The motherboard is formed out of a slice of anisotropic crystalline material cut out along precise crystallographic cutting planes. The material of the motherboard is preferably silicon, the techniques for processing this crystalline material being perfectly known. In the case of silicon, the motherboard is cut for example parallel to the crystallographic plane conventionally referenced (1,0,0).

Before the hollowing out of the grooves and female microstructures, the motherboard 3 is covered on each of its faces, with protective layers 60 and 61. In the case of silicon, the protection may be obtained by thermal oxidation, which forms surface layers 60 and 61 of silica.

In the next step, illustrated by the view 6b, the protective layer 60 of the upper surface of the motherboard is cut out along the groove template 62.

Since it is preferable to thin the motherboard locally at the positions of the future female microstructures, it is also planned to cut out wide apertures 63 in the protective layer 61 of the lower face of the motherboard. The apertures 63 correspond to and cover said locations.

In the following steps, illustrated by the views 6b to 6d, the motherboard undergoes chemical etching at the apertures 63 and 62 of the protective layers, thus making it possible first of all to thin the motherboard at the locations of the female microstructures and, secondly, to hollow out grooves 66 on the surface of the motherboard in the direction of the longitudinal axis OA.

The thinning of the motherboard and the hollowing of the grooves are preferably done in two successive steps, although a single step, in which the motherboard is plunged into a chemical attack bath, may be enough.

The hollowing out of the grooves is done by anisotropic chemical attack. An attack of this kind gives the grooves a rectilinear trace, that is strictly parallel to the crystallographic axis, and a particular V-shaped profile, the perfectly plane flanks being inclined at an angle α determined by the crystallographic structure as illustrated in FIG. 7.

In the case of silicon, the anisotropic chemical attack is done in a highly alkaline bath, for example a bath of caustic soda (NaOH) or potassium hydroxide (KOH), producing an attack along the crystallographic planes conventionally referenced (1,1,1).

The motherboard thus has parallel grooves 66 hollowed out on the surface and fine membranes 64 at the locations of the female microstructures.

According to one mode of the method, the axial buttonhole-shaped apertures 65 of the female microstructures are then hollowed out by laser ablation, advantageously making it possible to obtain a very precise cut with perfectly vertical aperture flanks.

According to another mode of a method, the axial buttonhole-shaped apertures 65 of the female microstructures are hollowed out by anisotropic etching by means of a fluorine-based plasma which too advantageously makes it possible to obtain vertical aperture flanks.

According to a preferred mode of a method, the axial buttonhole-shaped apertures 65 of the female microstructures are hollowed out at the same time as the grooves 66 in a single anisotropic chemical etching step. This mode of a method has the advantage of eliminating any risk of error in the positioning of the apertures 65 with respect to the grooves 66. However, since the female microstructures 65 are opened in thin membranes, the defect of verticality of the flanks of the apertures 65 of the female microstructures does not affect the positioning precision of the male microstructures or the strength of the mounting.

Finally, if necessary, the method for making the motherboard is completed by the elimination of the protective layer or layers so that the motherboard has a surface and ribs between grooves that are bare and perfectly plane, as illustrated by the view 6e.

One advantage of the method is that few steps are implemented in order to obtain a structure for the mounting of miniature optical components according to the invention.

Another advantage of the method according to the invention is it implements simple and precise etching and metal deposition technologies that are perfectly controlled at the present time.

An essential advantage of the method according to the invention is that it can be automated, enabling the industrial-scale manufacture and/or mounting of miniature optical components in large batches.

A consecutive advantage of the invention is that it enables the manufacture, mounting and installation of miniature optical components at low cost.

Finally, an essential and advantageous particular feature of the invention is that it makes use of metal deposition, hence an addition of matter, to form the male microstructures on the surface of the chip, unlike the known "flip-chip" techniques which provide for the etching of the chip, this etching being necessarily specific to the substrate used.

Consequently, the invention has the advantage of being applicable to any type of optical integrated circuit chip and any kind of substrate, since the method of assembly makes use of a metal deposit that does not depend on the nature of the substrate or on the technology of implantation of the waveguides.

This means that it is possible to envisage the application of the method of mounting miniature optical component according to the invention to independently manufactured chips of integrated optic circuits and design a motherboard and assembly plates that can be adapted to a variety of integrated optic circuit chips.

Furthermore the invention provides for a method and device for the manufacture of miniature optical component motherboards, designed to facilitate the batch manufacture of motherboards and further reduce the cost of the miniature optical component.

The method of manufacture according to the invention consists in making motherboards by molding on a raised matrix that gives a hollow impression of the grooves and of the female microstructures in each motherboard.

The matrix device implemented according to this method of manufacture therefore has a shape (not shown) complementary to that of a motherboard according to the invention. The surface of the matrix therefore has raised ribs parallel to an axial direction and projecting microstructures in the shape of axial tongues. Since the impression of the ribs must form grooves with a V-shaped profile, the ribs are designed so that they have a profile in the shape of the Greek letter $\Lambda$. Similarly, the projecting microstructures of the matrix have a shape complementary to that of the axial buttonholes explained here above, with a wide distal part and then a gradual constriction towards another narrow distal part that finishes axially in an end shaped like an isosceles triangle.

Consequently, it is planned that the matrix will be made out an anisotropic crystalline material such as silicon. As an alternative, the matrix may be made of metal by taking a metal impression of a motherboard made of silicon or any other anisotropic crystalline material.

By contrast, the motherboards made by molding on a matrix according to the manufacturing method of the invention may advantageously consist of any type of thin material capable of forming impressions with micrometric precision.

Thus, the motherboards obtained according to a method of manufacture of this kind are not necessarily constituted by anisotropic crystalline material.

The advantage of a method such as this and a matrix device such as this is that it favors the manufacture of motherboards for the mounting of miniature optical components in batches with a high replication rate and at very low cost.

Other steps of the method, embodiments, variants and improvements in the mounting of miniature optical components could be implemented by those skilled in the art without going beyond the scope of the present invention, the object of the protection being defined by the following claims.

What is claimed is:

1. A miniature optical component designed to process optical signals transmitted by optic fibers, the component comprising a mounting of the following elements:

a motherboard of anisotropic crystalline matter, hollowed out on the surface with grooves that are parallel to an axial direction, each groove being adapted to receive an optic fiber, align it in the axial direction and position it in a transversal plane, and a substrate chip, one face of which comprises optical waveguides, the mounting consisting in taking the face of the chip against the surface of the motherboard wherein:

the surface of the motherboard is hollowed out with female microstructures in the shape of axial buttonholes with sub-millimeter dimensions, and wherein, the face of the chip has projecting male microstructures formed by metal deposition, capable of fitting into and sliding axially in the female microstructures during the mounting of the component.

2. A miniature optical component according to claim 1, wherein the female microstructures have a narrowed axial end in the form of an open angle that is symmetrical to the axial direction.

3. A miniature optical component according to claim 1, wherein the female microstructures go through the thickness of the motherboard.

4. A miniature optical component according to claim 3, wherein the motherboard is thinned at the locations of the female microstructures.

5. A miniature optical component according to claim 3, wherein a female microstructure has a catch part capable of blocking a male microstructure.

6. A miniature optical component according to one of the claim 1, wherein the male microstructures are mushroom-shaped.

7. A miniature optical component according to claim 6, wherein the female microstructures have a wide distal part capable of letting through a male microstructure mushroom head, and a narrow distal part capable of constricting the mushroom head.

8. A miniature optical component according to one of the claim 1, furthermore comprising the mounting of the motherboard on:

at least one plate of anisotropic crystalline material etched on the surface with grooves parallel to the axial direction, each groove being adapted to cover an optic fiber and hold it fixed in the transversal position, the surface of the plate comprising male microstructures formed by metal deposition, capable of fitting into and sliding axially in female microstructures of the motherboard, during the mounting of the component.

9. A miniature optical component according to claim 8, wherein the male microstructures of the plate are mushroom-shaped.

10. A motherboard for miniature optical components, formed by anisotropic crystalline material and comprising a surface hollowed out with grooves parallel to the axial direction, each groove being adapted to receive an optic fiber, align it in the axial direction and position it in a transversal plane, the surface of the motherboard being capable of receiving an integrated optic circuit chip, wherein the surface of the motherboard is hollowed out with female microstructures in the shape of axial buttonholes with sub-millimeter dimensions.

11. A motherboard according to claim 10, wherein the female microstructures have a narrowed axial end in the form of an open angle that is symmetrical to the axial direction.

12. A motherboard according to claim 10, wherein the female microstructures go through the thickness of the motherboard.

13. A motherboard according to claim 12, wherein the motherboard is narrowed at the locations of the female microstructures.

14. A motherboard according to one of the claim 12, wherein a female microstructure has a catch part.

15. A motherboard according to one of the claim 10, wherein the female microstructures have a wide distal part and a narrow distal part.

16. An integrated optic circuit chip consisting of a substrate and comprising optic waveguides on one face, the face of the chip being capable of being attached against a motherboard to constitute a miniature optical component, wherein the face of the chip comprises projecting male microstructures with sub-millimeter dimensions formed by metal deposition.

17. A chip according to claim 16, wherein the male microstructures of the plate are mushroom-shaped.

18. A miniature optical component plate, the plate being formed by an anisotropic crystalline material and comprising a surface hollowed out with grooves parallel to an axial direction, each groove being adapted to receive an optic fiber, to align it in the axial direction and position it in a transversal plane, wherein the surface of the plane comprises projecting male microstructures, with sub-millimeter dimensions, formed by metal deposition.

19. A plate according to claim 18, wherein the male microstructures are mushroom-shaped.

20. A method for the mounting of a miniature optical component designed to process optical signals transmitted by optic fibers, the component comprising:

a motherboard of anisotropic crystalline matter having grooves on the surface that are parallel to an axial direction, each groove receiving an optic fiber in aligning it in the axial direction and positioning it in a transversal plane, and a substrate chip, one face of which comprises waveguides, the mounting consisting in attaching the face of the chip against the surface of the motherboard, the method comprising steps consisting in:

hollowing out female microstructures, in the shape of axial buttonholes, in the surface of the motherboard made of anisotropic crystalline material, the female microstructures having sub-millimeter dimensions, making a metal deposit to form projecting male microstructures on the face of the substrate chip, and fixedly joining the chip with the motherboard by fitting the male microstructures into the female microstructures, and by obtaining a sliding motion in the axial direction.

21. A method according to claim 20, comprising a preliminary step that consists in:

metallizing the face of the substrate chip.

22. A method according to claim 20, characterized by a step consisting in:

etching the metallization by keeping the metallized zones solely at the locations of the male microstructures.

23. A method according to one of the claim 20, wherein the metal deposit forming the male microstructures is done by electrolysis through sub-millimeter sized recessed openings pierced in a matrix covering the face of the chip.

24. A method according to claim 23, wherein electrolysis is prolonged so that the metal deposition flows over the recessed openings of the matrix.

25. A method according to claim 23, wherein the matrix is formed by a thick layer of polymer or resin.

26. A method according to claim 23, wherein the matrix is removed to bring out the male microstructures.

27. A method according to claim 20, wherein the female microstructures comprise a narrowed end in the form of an open angle that is symmetrical to the axial direction.

28. A method according to claim 20, wherein the hollowing of the female microstructures consists in:

making an anisotropic etching in the motherboard made of crystalline material.

29. A method according to one of the claim 20, wherein the hollowing of the female microstructures consists in:

performing a laser etching of the motherboard.

30. A method according to claim 20, wherein the hollowing of the female microstructures goes through the thickness of the motherboard.

31. A method according to claim 20, wherein the hollowing of the female microstructures comprises a preliminary step consisting in:

thinning the motherboard at the locations of the female microstructures.

32. A method according to claim 31, wherein the thinning of the motherboard and the hollowing out of the grooves are done during a single step of anisotropic chemical attack.

33. A method according to claim 20, wherein the hollowing out of the grooves and the hollowing out of the female microstructures are done during a single step of anisotropic chemical etching.

34. A method for the manufacture of motherboards of miniature optical components comprising a step consisting in:

molding the motherboard on a matrix whose surface comprises raised ribs, parallel to an axial direction, and projecting microstructures in the form of axial tongues with sub-millimeter dimensions.

35. A matrix device for the manufacture of motherboards of miniature optical components, wherein a surface of the matrix comprises raised ribs, parallel to an axial direction, and projecting microstructures shaped like axial tongues with sub-millimeter dimensions, and wherein the matrix is made of metal, the matrix being made by metal impression on a motherboard consisting of anisotropic crystal material.

36. A matrix device according to claim 35, wherein the projecting microstructures have a pointed end shaped like an isosceles triangle.

37. A matrix device according to claim 35, wherein the projecting microstructures have a wide distal part and a narrow distal part.

* * * * *

UNITED STATES PATENT AND TRADEMARK OFFICE
CERTIFICATE OF CORRECTION

PATENT NO. : 6,250,819 B1
DATED : June 26, 2001
INVENTOR(S) : Porte et al.

It is certified that error appears in the above-identified patent and that said Letters Patent is hereby corrected as shown below:

Column 17,
Line 1, please delete "according to one of the" and insert -- according to --.
Line 41, please delete "A motherboard according to one of the claim 12" and insert -- A motherboard according to claim 12 --.
Line 43, please delete "A motherboard according to one of the claim 10" and insert -- A motherboard according to claim 10 --.

Column 18,
Line 27, please delete "A method according to one of the claim 20" and insert -- A method according to claim 20 --.
Line 45, please delete "A method according to one of the claim 20" and insert -- A method according to claim 20 --.

Signed and Sealed this

Sixteenth Day of April, 2002

Attest:

JAMES E. ROGAN
*Director of the United States Patent and Trademark Office*

*Attesting Officer*